April 23, 1935.  M. E. McGINNIS  1,998,937
TRAILER
Filed Feb. 21, 1934
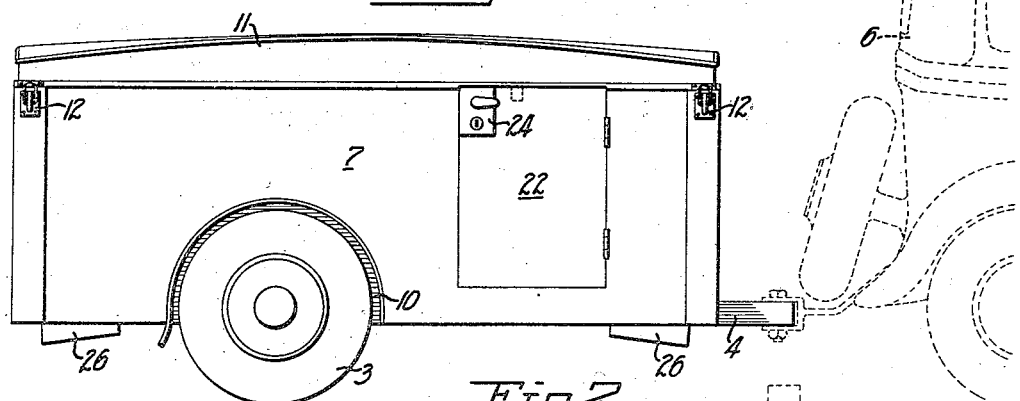
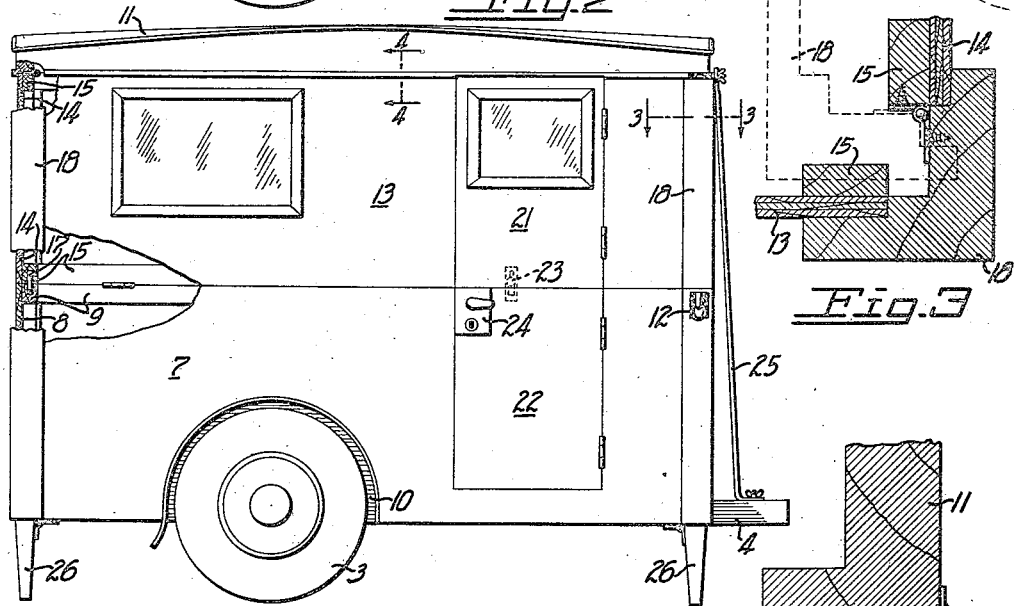
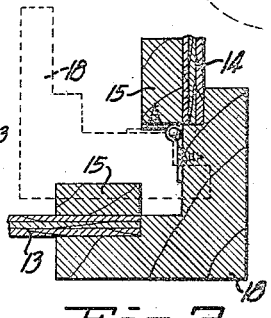
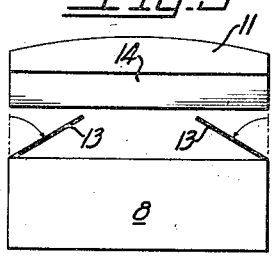
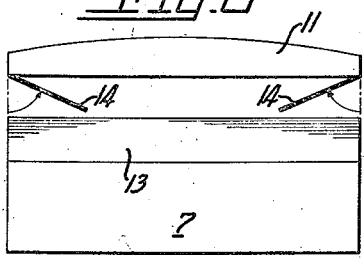
INVENTOR.
MILTON EUGENE McGINNIS.
BY
HIS ATTORNEY Patented Apr. 23, 1935

1,998,937

UNITED STATES PATENT OFFICE 1,998,937

TRAILER

Milton Eugene McGinnis, Petaluma, Calif.

Application February 21, 1934, Serial No. 712,322

1 Claim. (Cl. 296—23)

My invention relates to trailers, and more particularly to cabin trailers.

It is among the objects of my invention to provide a cabin trailer which may be hauled by an ordinary motor car.

Another object of my invention is to provide a trailer of the character described in which the cabin is collapsible into a compact unit for traveling.

Still another object of my invention is to provide a cabin structure which may be set up or collapsed in a short time and with a minimum of labor.

A further object of my invention is to provide a trailer having a cabin with ample head room when set up, yet which is sufficiently low in collapsed position to not interfere with the vision through the rear window of the automobile.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claim.

Referring to the drawing:

Figure 1 is a side elevational view of my trailer with the cabin collapsed and ready for travel.

Figure 2 is a side view of the trailer with the cabin assembled.

Figure 3 is a fragmentary horizontal sectional view taken in the plane indicated by the line 3—3 of Figure 2, showing the corner construction.

Figure 4 is a fragmentary vertical sectional view taken in the plane indicated by the line 4—4 of Figure 2, showing the joint between the side wall and top.

Figure 5 is a rear elevational view, largely diagrammatic, showing the collapsibility of the parts; and Figure 6 is a similar view taken from the side.

In terms of broad inclusion, the cabin trailer embodying my invention comprises a base section having side and end walls, and an upper section having walls providing continuations of the base walls. Means are provided for fastening the upper section walls in the upright position, and means are provided for hingedly mounting the upper walls so that they may be collapsed on the base section. A top is also provided and is arranged to provide a roof for the cabin in the upright position of the walls, and a cover for the walls. base section in the collapsed position of the walls.

A door is provided for the cabin and is preferably divided into two portions along the line of separation of the wall sections so that the upper door portion will fold inwardly with the wall section.

In greater detail, the cabin trailer embodying my invention comprises a base section mounted on a running gear having wheels 3 and having a tongue 4 for connecting the trailer to the rear end of an automobile 6. The base section of the trailer is preferably of rectangular box-like shape having a suitable floor, and having side walls 7 and end walls 8 constructed of a suitable material, such as three-ply wood, paneled in reinforcing frames 9. The wheels of the running gear are preferably tired, and are preferably set in metal lined recesses 10 to provide fenders.

As shown in Figure 1, the base section of the trailer is covered by a top 11 arranged to seat on the upper edges of the walls 7 and 8. This top is preferably provided with a curved upper surface to form a watershed and is preferably covered with a suitable weatherproofing material. Suitable means, such as the loose-link trunk fasteners 12, are provided for clamping the cover to the base section when traveling. The overall height of the trailer in its traveling condition is such as not to obstruct the rear view of the operator in the automobile.

Referring to Figure 2, the upper section of the trailer cabin comprises the side walls 13 hingeably connected to the upper edges of the base walls 7, and end walls 14 hingeably connected to the end edges of the top 11. In their upright position these walls form extensions of the base walls, and carry the top 11 in an elevated position where it provides a roof for the cabin. These walls also are preferably of ply wood, paneled in suitable frames 15. The upper edges of the side walls 13 are secured to the top 11 by suitable means, such as the latch fasteners 16 (note Figure 4); and the lower edges of the end walls 14 are secured to the base section by suitable fastening means, such as the dowel pins 17 socketed in the base frame 9 (note Figure 2).

As best shown in Figure 3, the corners of the upper wall sections are made tight by an L-shaped bar 18 hingeably connected to an end wall 14 so that it may swing inwardly and out of the way when the trailer is collapsed. The door leading into the cabin preferably comprises two portions, divided along the line of separation of the trailer sections; the upper door portion 21 being hingeably connected to the upper wall section 13, and the lower portion 22 being hingeably connected to the lower wall section 7. When the cabin is assembled these door portions are secured by a suitable feastener 23. The door latch 24 is arranged adjacent the upper edge of the lower door portion 22.

A tie rod 25 is preferably provided for bracing the assembled cabin, and is releasably connected at one end to the upper edge of the cabin, and at the other end to the tongue 4. Legs 26 are preferably provided adjacent the front and rear ends of the trailer for holding the latter in horizontal position when disconnected from the automobile. These legs are preferably hingeably mounted on the bottom of the trailer so they may be swung up out of the way and latched.

When the cabin is to be collapsed the wall fasteners 16 and door fastener 23 are loosened and the side walls together with the door portion 21 are folded inwardly and downwardly to their collapsed position on the base section. After removing the tie rod 25 and turning in the corner bars 18, the end wall dowel fasteners are lifted from their sockets and the end walls swung inwardly while the top is simultaneously lowered to its collapsed position on the base section. Figures 5 and 6 clearly illustrate the folding movements of the side and end walls. After the connectors 12 have been made fast and the legs 26 swung up out of the way, the trailer is ready for the road. The tie rod 25 is stored within the trailer while traveling. A feature of special note is the fact that the lower half of the door may be opened in the collapsed condition of the cabin. This gives access to the interior of the trailer when traveling, without having to remove the cover.

I claim:

A cabin trailer comprising a base section having side and end walls, an upper section having side and end walls providing continuations of the base walls and collapsible on the base section, and a top providing a roof for the cabin in the upright position of the walls and adapted to provide a cover for the base in the collapsed position of said walls, and L-shaped bars for capping the corners of said cabin and hingeably connected to the upper section walls.

MILTON EUGENE McGINNIS.